United States Patent
Fan et al.

(10) Patent No.: US 12,254,718 B1
(45) Date of Patent: Mar. 18, 2025

(54) MULTI-DEVICE ENROLLMENT FOR BIOMETRIC IDENTIFICATION SYSTEM

(71) Applicant: AMAZON TECHNOLOGIES, INC., Seattle, WA (US)

(72) Inventors: Quanfu Fan, Lexington, MA (US); Hongcheng Wang, Bellevue, WA (US); Carlos D. Castillo, Seattle, WA (US); Manoj Aggarwal, Seattle, WA (US); Gerard Guy Medioni, Los Angeles, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 18/615,639

(22) Filed: Mar. 25, 2024

(51) Int. Cl.
  *G06V 40/50* (2022.01)
  *G06V 10/82* (2022.01)
  *G06V 40/12* (2022.01)
  *G06V 40/13* (2022.01)

(52) U.S. Cl.
  CPC .............. *G06V 40/50* (2022.01); *G06V 10/82* (2022.01); *G06V 40/1318* (2022.01); *G06V 40/1365* (2022.01)

(58) Field of Classification Search
  CPC .... G06V 40/50; G06V 10/82; G06V 40/1318; G06V 40/1365; G06V 10/95; G06V 40/1312; G06V 40/70; G06V 40/11; G06F 18/213; G06F 18/2148
  See application file for complete search history.

(56) References Cited

U.S. PATENT DOCUMENTS

| | | | |
|---|---|---|---|
| 11,688,198 B1* | 6/2023 | Ranjan | G06F 18/213 |
| | | | 382/115 |
| 12,131,575 B1* | 10/2024 | Aggarwal | G06V 40/1347 |
| 2021/0073648 A1* | 3/2021 | Lichenstein | G06V 10/82 |
| 2021/0141896 A1* | 5/2021 | Streit | G06F 21/32 |

(Continued)

OTHER PUBLICATIONS

Buda, et al., "A systematic study of the class imbalance problem in convolutional neural networks", Oct. 13, 2018, 21 pgs. Retrieved from the Internet: URL: https://arxiv.org/pdf/1710.05381.pdf.

(Continued)

*Primary Examiner* — Abhishek Sarma
(74) *Attorney, Agent, or Firm* — Lindauer Law, PLLC

(57) ABSTRACT

User enrollment to a biometric identification system begins on selected general input devices (GID) such as smartphones. The user may enter identification data (e.g. name) and use a red-green-blue (RGB) camera of the GID to acquire a first image (e.g. hand). The first image is processed using both a first model to determine a first representation and a second model to determine a second representation. Upon presentation of a hand at a biometric input device, a second image is acquired using a first modality and a third image is acquired using a second modality. The second image is processed using the first model to determine a third representation. The third image is processed using the second model to determine a fourth representation. Given a match between both the first and third representations, as well as the second and fourth representations, enrollment is completed by storing the third and fourth representations.

20 Claims, 10 Drawing Sheets

(56) References Cited

U.S. PATENT DOCUMENTS

2022/0300593 A1* 9/2022 Brownlee .......... G06V 40/1353

OTHER PUBLICATIONS

Chawla, et al., "SMOTE: Synthetic Minority Over-sampling Technique", Journal of Artificial Intelligence Research, Jun. 2002, 37 pgs. Retrieved from the Internet: URL: https://arxiv.org/pdf/1106.1813.pdf.

Haixiang, et al., "Learning from class-imbalanced data: Review of methods and applications", May 1, 2017, 8 pgs. Retrieved from the Internet: URL: https://www.sciencedirect.com/science/article/abs/pii/S0957417416307175.

Hughes, Chris, "Demystifying PyTorch's WeightedRandomSampler by Example", Towards Data Science, Aug. 30, 2022, 29 pgs. Retrieved from the Internet: URL: https://towardsdatascience.com/demystifying-pytorchs-weightedrandomsampler-by-example-a68aceccb452.

Johnson, et al., "Survey on deep learning with class imbalance", Journal of Big Data, Article No. 27, Mar. 19, 2019, 54 pgs. Retrieved from the Internet: URL: https://journalofbigdata.springeropen.com/articles/10.1186/s40537-019-0192-5.

Sandler, et al., "MobileNetV2: Inverted Residuals and Linear Bottlenecks", Google, Inc., Mar. 21, 2019, 14 pgs. Retrieved from the Internet: URL: https://arxiv.org/pdf/1801.04381.pdf.

* cited by examiner

MULTI-DEVICE ENROLLMENT FOR BIOMETRIC IDENTIFICATION SYSTEM

BACKGROUND

Biometric input data may be used to recognize and assert an identity of a user.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
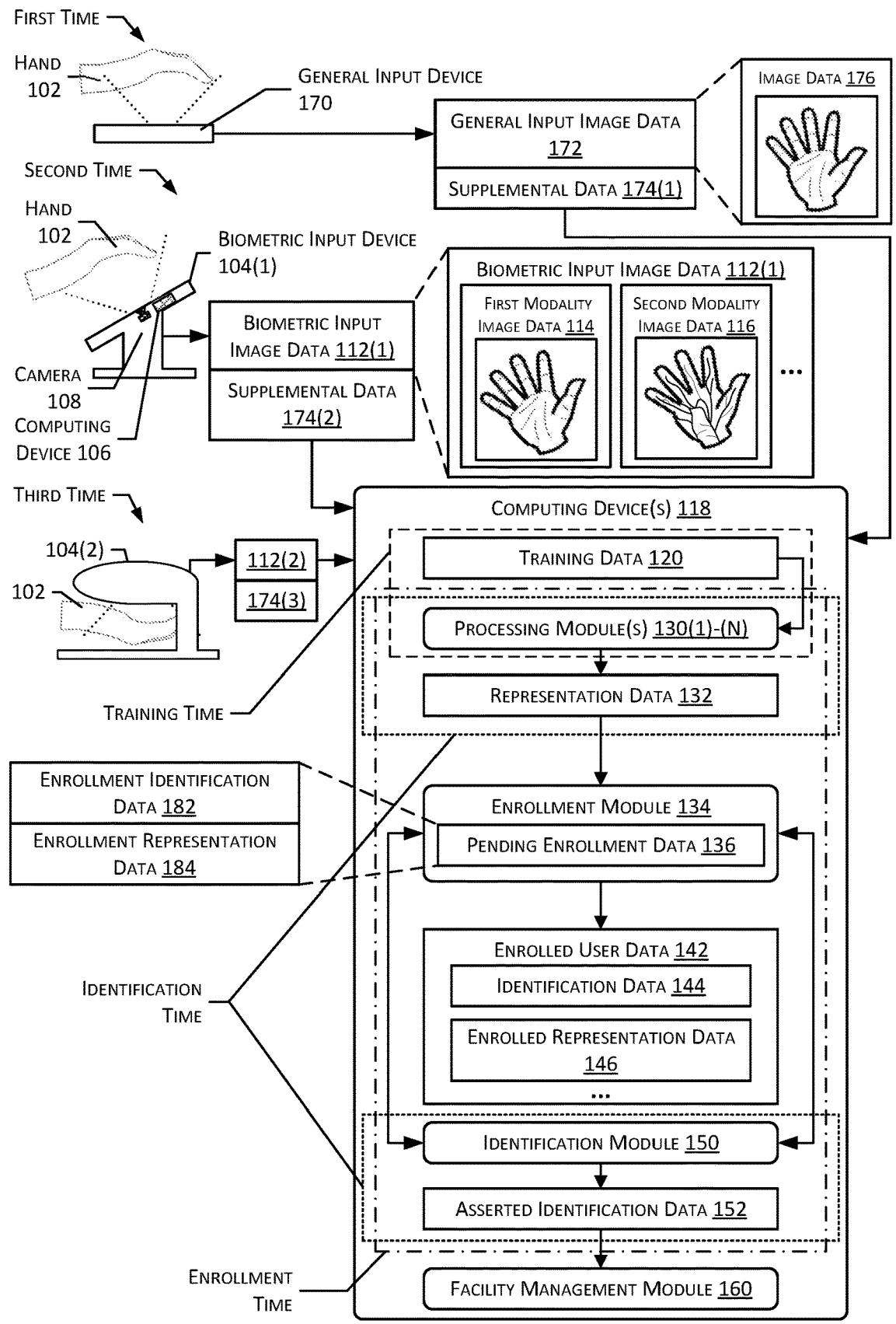
FIG. 1 illustrates a biometric identification system that provides a multi-device enrollment process, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Biometric identification offers several advantages in a wide variety of use cases. For example, biometric identification may be used to facilitate payment at a point of sale, to provide access to a facility, and so forth.

Biometric identification may use as input various types of biometric input data. In one implementation the biometric input data may comprise an image of a hand. The biometric input data may be acquired using one or more modalities. For example, a first modality may comprise images of surface skin of a user's palm while a second modality may comprise images of subcutaneous features such as veins of the user's palm. The use of input data that includes two or more modalities provides several advantages for biometric identification. One advantage is the potential for decorrelation between the modalities that may improve overall accuracy. For example, each modality may provide different features, providing more distinct information that may better distinguish one person from another, determine the presence of an artifact such as a realistic-appearing face mask or fake hand, and so forth. While some features may be common across the different modalities, other features vary. For example, the overall shape of the hand may be apparent across modalities, while information such as friction ridges, veins, and so forth may differ between images in the different modalities acquired of the same hand.

During operation, a biometric identification system acquires input data using these different modalities. During an enrollment process, a user opts in to participate in using the system. The user may provide identification data, such as their name, account credentials, telephone number, and so forth. The user uses a biometric input device to provide the biometric input data. For example, the user may present their hand to a biometric input device that acquires biometric input image data comprising image data acquired using various modalities. The biometric input image data is processed to determine an enrolled representation that is stored for later use. The identification data is also stored and is associated with the enrolled representation. At a later time, a match of a query representation to the enrolled representation may then be used to assert the identity indicated by the associated identification data.

In addition to the acquisition of the biometric input image data, the biometric input device may include other features such as robust anti-tampering elements, liveness detection hardware to determine if an object being imaged is a live person, and so forth. Deployment of the biometric input devices may be limited to businesses, institutions, or other organizations. In comparison, general input devices such as cellphones, tablet computers, home electronic devices such as smart displays with cameras, and so forth are widely available.

Traditionally the enrollment process for a biometric identification system involves a specific interaction that may be inconvenient to the user. For example, a user may have to go to a specified location that has a biometric input device, submit the identification data, use the biometric input device to acquire biometric input image data, and so forth. In another example, a user may provide their identification data using another device and receive a quick response (QR) code or other token which they then present at the specified location. Continuing the example, this reduces the need to acquire identification data at the specified location, but still requires the presentation and acquisition of the biometric input image data as a separate process. The specified location and the time associated with completing the enrollment process may not be convenient to the user, resulting in an adverse user experience. This may limit use of the system.

Described in this disclosure are techniques and systems for multi-device biometric identification system enrollment. At a first time, a user utilizes a general input device to start an enrollment process. For example, the general input device may be used to acquire enrollment identification data from the user and general input image data of the user. The general input image data utilizes a different modality during acquisition than the biometric input device. For example, the general input device may have a visible light camera that acquires red-green-blue (RGB) images depicting a hand in visible light. Continuing the example, the biometric input device may have an infrared (IR) camera that acquires infrared images depicting the hand in infrared light.

The general input image data is processed to determine a first set of representation data comprising first representation data associated with a first embedding space and second representation data associated with second embedding space. A first processing module is used to process the general input image data and generate the first representation data. The first processing module comprises a first machine learning network that was trained using image data with the same modality as that used by the general input device and first modality image data associated with the biometric input device. A second processing module is used to process the general input image data and generate the second representation data. The second processing module comprises a second machine learning network that was trained using image data with the same modality as that used by the general input device and second modality image data associated with the biometric input device.

The first set of representation data is stored and associated with the enrollment identification data. In some implementations, the first set of representation data, or a portion thereof, may expire after a particular time or event. For example, the first set of representation data may be deleted if unused within 10 days.

At a later time, the user presents their hand at the biometric input device. For example, the user may wish to provide payment at a point of sale or be granted access to a facility. The biometric input device acquires a first set of biometric input image data comprising first modality image data and second modality image data. These biometric input images are processed to determine a second set of representation data. The first processing module is used to process the first modality image data and generate third representation data that is also associated with the first representation space. The second processing module is used to process the second modality image data and generate fourth representation data that is also associated with the second representation space. The third representation data and the fourth representation data are compared to previously stored enrolled representation data. If no match is found, the third and fourth representation data are compared with the first set of representation data.

If the first set of representation data (based on an image acquired from the general input device) and the second set of representation data (based on images acquired by the biometric input device) are deemed to match, the enrollment identification data may be associated with the second set of representation data. The second set of representation data may then be stored as enrolled representation data, associated with the identification data, and subsequently used for identification.

In some situations, during this initial use of the biometric input device, the user may be prompted to provide additional information. For example, the user may be prompted to enter, using the biometric input device, their telephone number, an account name, provide an EMV or other card to be read electronically (or "dipped"), enter data sent to an associated but different device such as code sent to a cellphone, answer an authentication question, and so forth.

By using these techniques and systems, from the user's perspective the interaction associated with the enrollment process is limited to the operations on the general input device and may be completed before encountering the biometric input device for the first time. When the user proceeds to an initial use of the biometric input device, that use results in the acquisition of the biometric input image and other data such as liveness detection, without requiring a separate set of steps or operations for the user. Instead of having the user go to a specified location such as a particular kiosk or customer service area, any participating biometric input device in the biometric identification system may be used by the user to complete the enrollment process with little or no additional effort.

The user experience and utilization of the biometric input device is also improved as the user is also able to utilize the system in an operational capacity during their initial use of the biometric input device. For example, a transaction associated with the user such as a purchase or opening a door, may be completed during that initial use of the biometric input device. From the perspective of the user, they may present their hand and the intended transaction such as the purchase or opening the door is completed.

As mentioned above, in some circumstances during the initial use, the user may be prompted to provide additional information at the biometric input device. This interaction may be minimal and readily performed by the user. For example, users are accustomed to presenting or "dipping" an EMV card at a point of sale. During subsequent uses of the system, the user may simply present their hand to complete further transactions.

Illustrative System

FIG. 1 illustrates a biometric identification system 100 that provides a multi-device enrollment process, according to some implementations. The system 100 is described as being used as part of a biometric identification system that determines an identity of a user. However, the system and techniques described herein may be used in other situations.

At a first time, a hand 102 of a user is depicted positioned above a general input device 170. During the first time, the user may perform at least a portion of the multi-device enrollment process described below.

The general input device 170 may comprise a cellphone, a tablet computer, home electronic devices such as smart displays, a doorbell security camera, a robot, and so forth. The general input device 170 may include a computing device and a sensor, such as a camera. The general input device 170 is used to acquire general input image data 172 or other input data. The general input image data 172 may comprise image data 176 representing a color visible light image comprising red, green, and blue (RGB) channels, or grayscale. For example, the general input device 170 may comprise a visible light camera. The general input image data 172 may comprise a single image, series of images, video data, or other image data. The camera may be configured to acquire an image using a single modality, such as color or grayscale image data 176. During operation, as described below in more detail, the general input image data 172 is processed to determine enrollment representation data 184. The general input image data 172 is shown as having a single image data 176 for ease of illustration and not necessarily as a limitation. In some implementations the general input image data 172 may comprise other modalities. In some of these implementations, the modalities acquired by the general input device 170 may differ by at least one modality from those used by a biometric input device 104 as described below. For example, the general input image data 172 or other input data may comprise LIDAR data of the hand 102, point cloud data of the hand 102, different images acquired while illuminating with different colors of light, data obtained from a touch or fingerprint sensor, and so forth. In another example, the other input data acquired by the general input device 170 may include other types of data, such as audio data comprising speech from the user. In some implementations the other input data may include other images of the user, such as an image of the user's face.

Enrollment identification data 182 may also be determined. The enrollment identification data 182 may comprise one or more of name, account credentials, telephone number, and so forth. In some implementations the enrollment identification data 182 may comprise data acquired during operation of the general input device 170. For example, the user may enter account login credentials to an application executing on the general input device 170. The enrollment identification data 182 may be determined based at least in part on a successful login to a participating service, website, device, and so forth.

The general input device 170 may also determine supplemental data 174(1). The supplemental data 174(1) may comprise one or more of system metadata or user data. The supplemental data 174 is discussed in more detail with regard to FIG. 2.

At a second time, the user may proceed to use one or more biometric input devices 104. The biometric input device 104 may include a computing device 106 and a camera 108. The camera 108 has a field of view (FOV). During operation of the biometric input device 104, the camera 108 acquires images of an object in the FOV, such as the hand 102, using one or more modalities and provides biometric input image data 112(1). The images may comprise single images, a series of images, video data, or other image data. The biometric input device 104 may include other components that are not shown. For example, the biometric input device 104 may include lights that illuminate the object in the FOV, a communication interface, and so forth.

As shown at the second time, the user utilizes the biometric input device 104(1). The hand 102 of the user is depicted positioned above the biometric input device 104(1). In other implementations, other configurations may be used. For example, the camera 108 of the biometric input device 104(2) has the FOV extending downwards, and the user places their hand 102 in the FOV under the biometric input device 104(2).

In some implementations the biometric input device 104 may acquire other input data. For example, the biometric input device 104 may acquire an image of the user's face. In another example the biometric input device 104 may acquire audio data comprising speech from the user.

During operation, the biometric input device 104 may also determine supplemental data 174(2). For example, the supplemental data 174(2) may comprise additional information such as results from liveness detection, data acquired from electronically reading a user-provided EMV card, and so forth.

In one implementation, the biometric input device 104 is configured to acquire images of the hand 102 that are illuminated using infrared light emitted from one or more illuminators that has two or more particular polarizations, with different illumination patterns, and so forth. For example, during operation the user may present their hand 102 with the palm or volar region of the hand toward the biometric input device 104. As a result, the biometric input image data 112 provides an image of the palm of the hand 102. In other implementations, the biometric input image data 112 may include the back of the hand 102. Separate images associated with different modalities may be acquired using different combinations of polarized light provided by the infrared illuminators.

Depending upon the polarization used, the images produced by the biometric input device 104 may be of first modality features or second modality features. The first modality may utilize images in which the hand 102 is illuminated with light having a first polarization and obtained by the camera 108 with a polarizer passing light to the camera 108 that also has the first polarization. First modality features may comprise features that are close to, or on, a surface of the hand 102 of the user. For example, the first modality features may include surface features such as creases, wrinkles, scars, dermal papillae ridges, and so forth in at least the epidermis of the hand 102. Images acquired using the first modality may be associated with one or more surface features.

Second modality features comprise those features that are below the epidermis. The second modality may utilize images in which the hand 102 is illuminated with light having a second polarization and obtained by the camera 108 with the polarizer passing light to the camera 108 with the first polarization. For example, the second modality features may include subcutaneous anatomical structures such as veins, bones, soft tissue, and so forth. Some features may be visible in both first modality and second modality images. For example, a crease in the palm may include first modality features on the surface as well as deeper second modality features within the palm. Images acquired using the second modality may be associated with one or more subcutaneous features.

Separate images of the first and second modalities may be acquired using different combinations of polarized light provided by infrared illuminators. For example, the infrared illuminators may comprise light emitting diodes (LEDs), electroluminescent devices, lasers, incandescent lamps, and so forth. The biometric input image data 112 may comprise images acquired using a plurality of modalities. For example, the biometric input image data 112 may comprise a first image acquired using a first modality, a second image acquired using a second modality, and so forth. Multiple images of the same object may be acquired in rapid succession with respect to one another. For example, the camera 108 may operate at 60 frames per second and acquire individual frames of nth modality image data.

During operation, the general input device 170 may acquire the general input image data 172 using a different modality than that used by the biometric input device 104 to acquire biometric input image data 112. For example, the general input image data 172 may comprise an RGB or grayscale image of the hand 102 with a first resolution and using lighting from a single source (such as the flash of the general input device 170). Continuing the example, the biometric input image data 112 may comprise a first modality image and a second modality image of the hand 102 with a second resolution and using infrared lighting provided by multiple sources and using differential polarization to image veins and other subcutaneous features. In this example, the general input image data 172 and the biometric input image data 112 are different modalities.

A computing device 118 is shown. One or more computing device(s) 118 may execute one or more of the following modules.

During a "training time" training data 120 is used to train one or more processing module(s) 130(1), 130(2), . . . , 130(N) to determine representation data 132. In one implementation, the training data 120 may comprise a plurality of RGB or grayscale images, first modality, and second modality images that have been labeled. For example, label data may indicate a sample identifier, identity label, modality label, and so forth. The training data 120 is discussed in more detail with regard to FIG. 3.

The processing module(s) 130 may each comprise a machine learning network. For example, each processing module 130 may implement a convolutional neural network (CNN) that includes an inverted residual layer with linear bottleneck, such as that implemented by the MobileNetV2 architecture described by Sandler, et. al. In other implementations, other machine learning architectures may be used. As part of the training, the processing module(s) 130, or portions thereof, determine trained model data that is used to operate the processing modules 130 during inference. The machine learning network and the training process are discussed in more detail with respect to FIG. 4.

Once trained, the processing module(s) 130, or a portion thereof, may be used at inference to process input such as the general input image data 172 or the biometric input image data 112 and provide as output the representation data 132. The operation of the trained processing module(s) 130 is discussed in more detail with regard to FIG. 5.

During "enrollment time", users are able to utilize the system 100 by performing an enrollment process. The enrollment process may be subdivided into a first time, during which the user performs a first portion of the process using a general input device 170, and a second time during which the enrollment is completed using a biometric input device 104. An enrollment module 134 may coordinate the enrollment process. Enrollment may associate biometric information, such as representation data 132 based on biometric input image data 112 with particular identification data 144 comprising information such as a name, account number, and so forth.

During the first time of the enrollment process, the user opts in and presents their hand 102 to the general input device 170. The general input device 170 acquires general input image data 172 such as image data 176 that is then provided to a computing device 118 executing the trained processing modules 130(1)-(N). The trained processing modules 130(1) accept as input the general input image data 172 and provides as output a first set of representation data that is stored as enrollment representation data 184. For example, the image data 176 is processed by a first processing module 130(1) to determine first representation data and the image data 176 is processed by a second processing module 130(2) to determine second representation data. The enrollment representation data 184 is representative of at least some of the features depicted in the general input image data 172. In some implementations, the enrollment representation data 184 may comprise one or more vector values in one or more embedding spaces. The enrollment representation data 184 may comprise data associated with one or more intermediate layers or a final layer of the respective processing modules 130.

The enrollment identification data 182 is associated with the enrollment representation data 184. For example, both may be acquired using the same general input device 170. In another example, a first general input device 170(1), such as a tablet computer, may be used to acquire a portion of the enrollment identification data 182 while a second general input device 170(2) such as a cellphone is used to acquire a second portion of the enrollment identification data 182.

Pending enrollment data 136 is stored that comprises the enrollment identification data 182 and the enrollment representation data 184. Individual instances of enrollment representation data 184 are associated with respective instances of enrollment identification data 182. The pending enrollment data 136, or a portion thereof, may expire after one or more of a specified event or time. For example, the enrollment representation data 184 may be deleted if unused for more than a specified number of days. In another example, the enrollment identification data 182 and associated enrollment representation data 184 may be deleted after enrollment is completed. With the pending enrollment data 136 now available, the system 100 is ready for the user to complete the enrollment process at the second time.

During the second time of the enrollment process, the user presents their hand 102 to the biometric input device 104. The biometric input device 104 provides biometric input image data 112 to a computing device 118 executing the trained processing module(s) 130. The trained processing modules 130(1)-(N) accepts as input the biometric input image data 112 and provides as output a second set of representation data 132 comprising third representation data and fourth representation data. For example, first modality image data 114 is processed by the first processing module 130(1) to determine the third representation data. Continuing the example, second modality image data 116 is processed by the second processing module 130(2) to determine the fourth representation data.

The second set of representation data 132 is representative of at least some of the features depicted in the biometric input image data 112. In some implementations, the second set of representation data 132 may comprise one or more vector values in one or more embedding spaces. The second set of representation data 132 may comprise data associated with one or more intermediate layers or a final layer of the processing module(s) 130.

During the enrollment process, the second set of representation data 132 may be checked using an identification module 150 to determine whether the user has been previously enrolled. A successful enrollment may comprise storage of enrolled user data 142 comprising identification data 144, such as name, telephone number, account number, and so forth and storage of one or more of the representation data 132 or data based thereon as enrolled representation data 146. In some implementations, the enrolled representation data 146 may comprise additional information associated with processing of the biometric input image data 112 with the processing module(s) 130. For example, the enrolled representation data 146 may comprise data associated with one or more intermediate layers of the processing module(s) 130, such as the values of a penultimate layer of one or more portions of the processing module(s) 130.

If the second set of representation data 132 is deemed to not correspond to a previously enrolled user, the enrollment module 134 determines if the second set of representation data 132 corresponds to the enrollment representation data 184. Comparisons may be performed between representation data 132 that share a common representation space. For example, output from the first processing module 130(1) is associated with a first representation space and output from the second processing module 130(2) is associated with a second representation space. The enrollment module 134 may compare the first representation data with the third representation data, and the second representation data with the fourth representation data, and determine if they correspond to one another.

If the enrollment module 134 determines that the second set of representation data 132 is associated with the enrollment representation data 184, the enrollment process may be completed. For example, the enrollment identification data 182 may be stored as the identification data 144 and the second set of representation data 132 may be stored as the enrolled representation data 146. With enrollment complete, the corresponding enrollment representation data 184 and enrollment identification data 182 may be deleted from the pending enrollment data 136.

In some implementations other data may be used by the enrollment module 134. In some implementations, other biometric input data such as images of the user's face, audio data representative of the user's speech, and so forth may be used. For example, in addition to comparison of the second set of representation data 132 and the enrollment representation data 184, a comparison may be made between a first image of the user's face as acquired by the general input device 170 and a second image of the user's face as acquired by the biometric input device 104. In another example, in addition to comparison of the second set of representation data 132 and the enrollment representation data 184, a comparison may be made between first audio data of the user's speech as acquired by the general input device 170 and second audio data of the user's speech as acquired by the biometric input device 104. In yet another example, the speech and video data may be acquired by both the general input device 170 and the biometric input device 104, and subsequently compared.

In some implementations, the user may be prompted to provide additional information to complete the enrollment process. For example, during the second time the user may be prompted to provide an EMV or other card for electronic readout by the biometric input device 104. In other examples, the user may be asked to enter a code sent to another device such as a cellphone, provide an input using an application executing on another device such as the cellphone, and so forth.

From the point of view of the user, during this initial use of the biometric input device 104 during the second time, minimal or no interaction associated with the enrollment process is experienced. As a result, user convenience is substantially increased. This also reduces the time associated with users enrolling, allowing the biometric input device 104 to be available for non-enrollment use. From the point of view of the system 100, during the second time the second set of representation data 132 that is provided by the biometric input device 104 is obtained, as well as other information such as confirmation of liveness, authentication information, and so forth.

During "identification time" the (as yet unidentified) user presents their hand 102 at the biometric input device 104. The resulting query biometric input image data 112 may be processed by the (now trained) processing module(s) 130 to determine representation data 132. In some implementations, the computing device 106 may execute a trained processing module(s) 130. The computing device 106 may perform other functions, such as encryption and transmission of the biometric input image data 112 or data based thereon, such as the representation data 132.

The identification module 150 executing on the computing device(s) 118 may accept as input the input representation data 132 associated with the biometric input image data 112 acquired by the biometric input device 104. The input representation data 132 is compared to previously stored data, such as the enrolled representation data 146 to determine asserted identification data 152. In one implementation, the asserted identification data 152 may comprise a user identifier associated with the closest, in the embedding space(s), previously stored enrolled representation data 146 relative to the input representation data 132 associated with the user who presented their hand 102 during identification time. The identification module 150 may utilize other considerations, such as requiring that the query representation data 132 is no more than a maximum distance in the embedding space from the enrolled representation data 146 of a particular user before determining the asserted identification data 152.

The asserted identification data 152 may then be used by subsequent systems or modules. For example, the asserted identification data 152, or information based thereon, may be provided to a facility management module 160.

The facility management module 160 may use the asserted identification data 152 to associate an identity with the user as they move about a facility. For example, the facility management module 160 may use data from cameras or other sensors in the environment to determine a location of the user. Given a known path of the user from an entrance that utilizes the biometric input device 104, the user identity indicated in the identification data 144 may be associated with the user as they use the facility. For example, the now identified user may walk to a shelf, remove an item, and leave the facility. The facility management module 160 may determine the interaction data indicative of the removal of the item as being associated with the user identifier specified in the asserted identification data 152, and bill an account associated with the user identifier. In another implementation, the facility management module 160 may comprise a point of sale system. The user may present their hand 102 at checkout to assert their identity and pay using a payment account that is associated with their identity.

The systems and techniques described above are discussed with respect to images of human hands. These systems and techniques may be used with respect to other forms of data, other kinds of objects, and so forth. For example, these techniques may be used for facial recognition systems, object recognition systems, and so forth.

Figure 2:
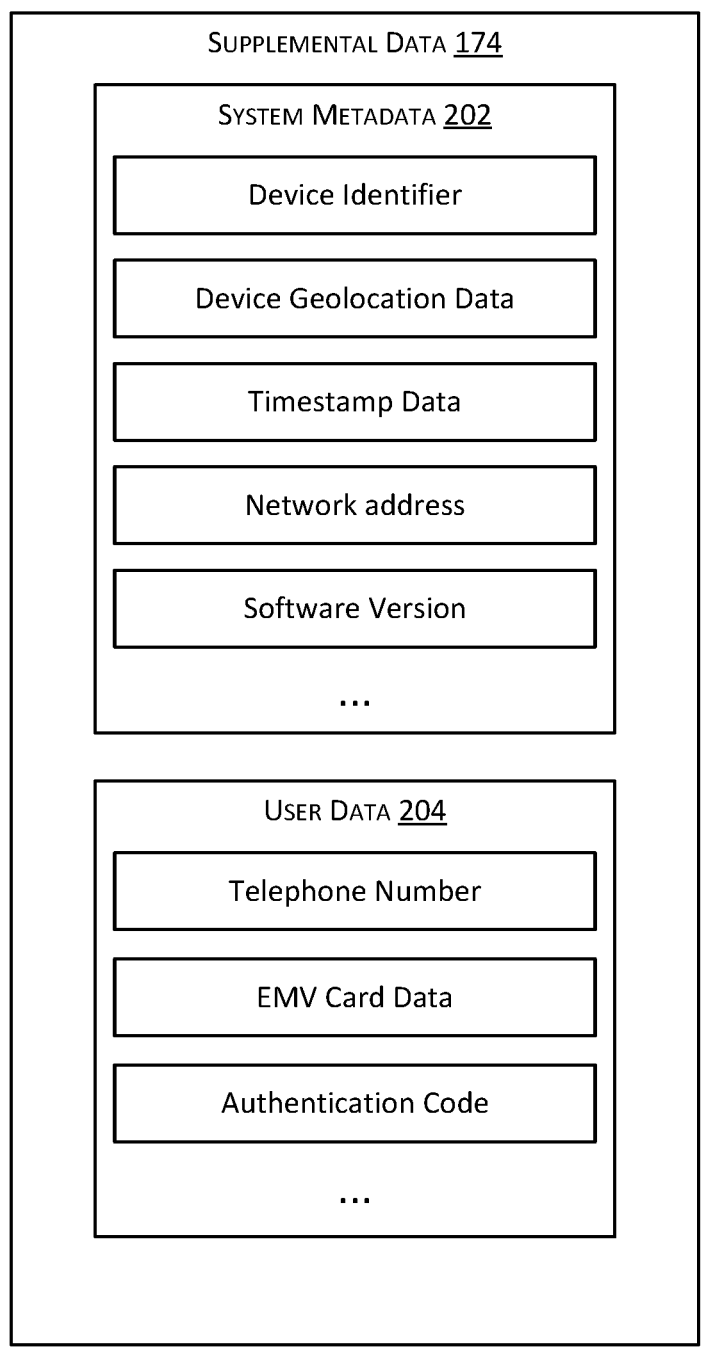
FIG. 2 illustrates supplemental data used by the system, according to some implementations.

FIG. 2 illustrates at 200 supplemental data 174 used by the system 100, according to some implementations. The supplemental data 174 may comprise one or more of system metadata 202 or user data 204. The supplemental data 174 may be associated with or otherwise indicative of operations such as acquisition of the general input image data 172 or other data, the biometric input image data 112, and so forth.

The system metadata 202 comprises information associated with the devices and their respective operation. For example, the system metadata 202 may comprise one or more of a device identifier indicative of a particular device, device geolocation data indicative of a location of the device, timestamp data indicative of date and time, a network address associated with operation of the device, software version used by the device, liveness detection data indicative of whether the input image is associated with a live user or an artifact, and so forth.

The user data 204 comprises information that is associated with a particular user. The user data 204 may be based on input from the user, or may be associated with the user. For example, the user data 204 may comprise a telephone number associated with the user, a payment account number, EMV card data, user account data obtained by an application executing on the device, an authentication code, or other information.

Figure 3:
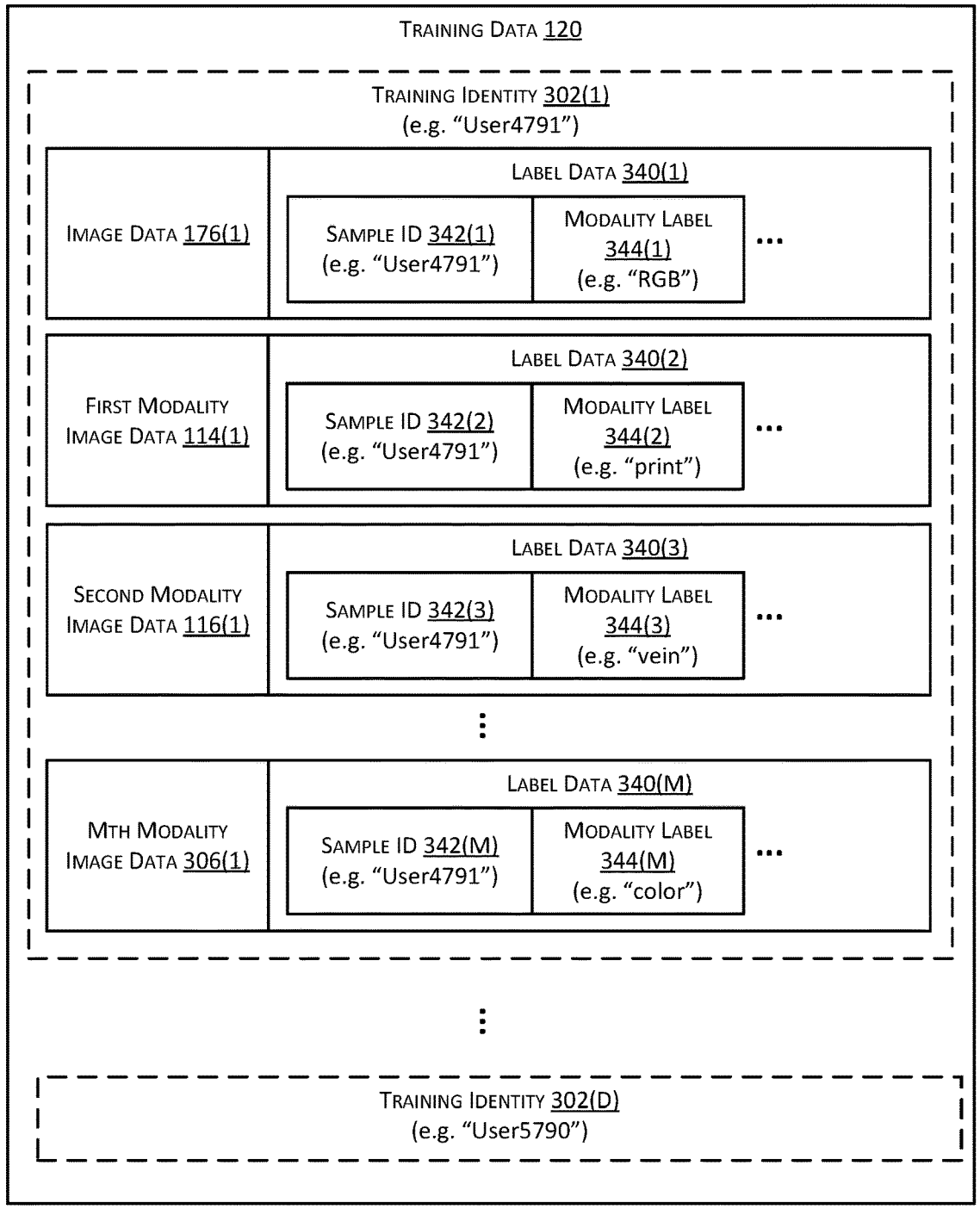
FIG. 3 illustrates training data that is labeled for training of an intersection processing module that may be used for pre-enrollment, according to some implementations.

FIG. 3 illustrates at 300 training data 120 that is labeled for training the processing modules 130, according to some implementations. The training data 120 comprises a plurality of images that are representative of a plurality of training identities, 302(1), 302(2), . . . , 302(D). Each training identity 302 may be considered to be unique with respect to the other training identities 302.

The information associated with each training identity 302 may comprise actual image data acquired from users who have opted in to provide information for training, synthetic input data that has been generated, or a combination thereof. In one implementation, the training data 120 may exclude individuals who have enrolled to use of the system 100 for identification. For example, enrolled users having identification data 144 may be excluded from inclusion in the training data 120. In another implementation, some enrolled users may opt in to explicitly permit biometric input image data 112 obtained during enrollment to be stored as training data 120.

The synthetic input data may comprise synthetic data that is consistent with expected biometric input image data 112. For example, the synthetic input data may comprise output from a generative adversarial network (GAN) that has been trained to produce synthetic images of a user's hand. In some implementations, the synthetic input data may be based on actual input data. In other implementations, other techniques may be used to determine the synthetic input data.

Each training identity 302(1)-302(D) includes modality image data and associated label data 340. The label data 340 may comprise information such as a sample identifier (ID) 342, modality label 344, and so forth. The sample ID 342 indicates a particular training identity. The sample ID 342 may be used to distinguish one training identity 302 from another. In implementations where actual input data is used as part of the training data 120, the sample ID 342 may be assigned independently of the actual identification data 144 associated with that user. For example, the sample ID 342 may have a value of "User4791" and not the actual identity of "Bob Patel". The modality label 344 indicates whether the associated image data is representative of a first modality, second modality, and so forth.

In this illustration, each training identity 302(1)-302(D) includes general input image data 172(1) such as image data 176(1) and associated sample ID 342(1) and modality label 344(1), and biometric input image data 112(1) and associated sample ID 342(2) and modality label 344(2). For example, each training identity 302(1)-302(D) may comprise modalities associated with operation of the biometric input device 104, such as first modality image data 114 and second modality image data 116. In implementations where additional modalities are used, the training data 120 for a training identity 302 may also include Mth modality image data 306(1) and associated sample ID 342(M) and modality label 344(M).

In some circumstances the training data 120 may be imbalanced. In one circumstance, a given training identity 302 or particular modality label 344 value may be associated with a relatively small or relatively large number of instances of image data. For example, identity imbalances may occur because some identities may have more than a 1000 instances of image data while others have fewer than 5. In another circumstance, modality imbalances may occur because some modalities, such as image data 176, have fewer instances of image data in the training data 120 than other modalities such as first modality image data 114 or second modality image data 116. For example, a training identity 302 may have no image data 176 and one or more instances of first modality image data 114 or second modality image data 116. Techniques for mitigating these imbalances are discussed with regard to FIG. 4.

Figure 4:
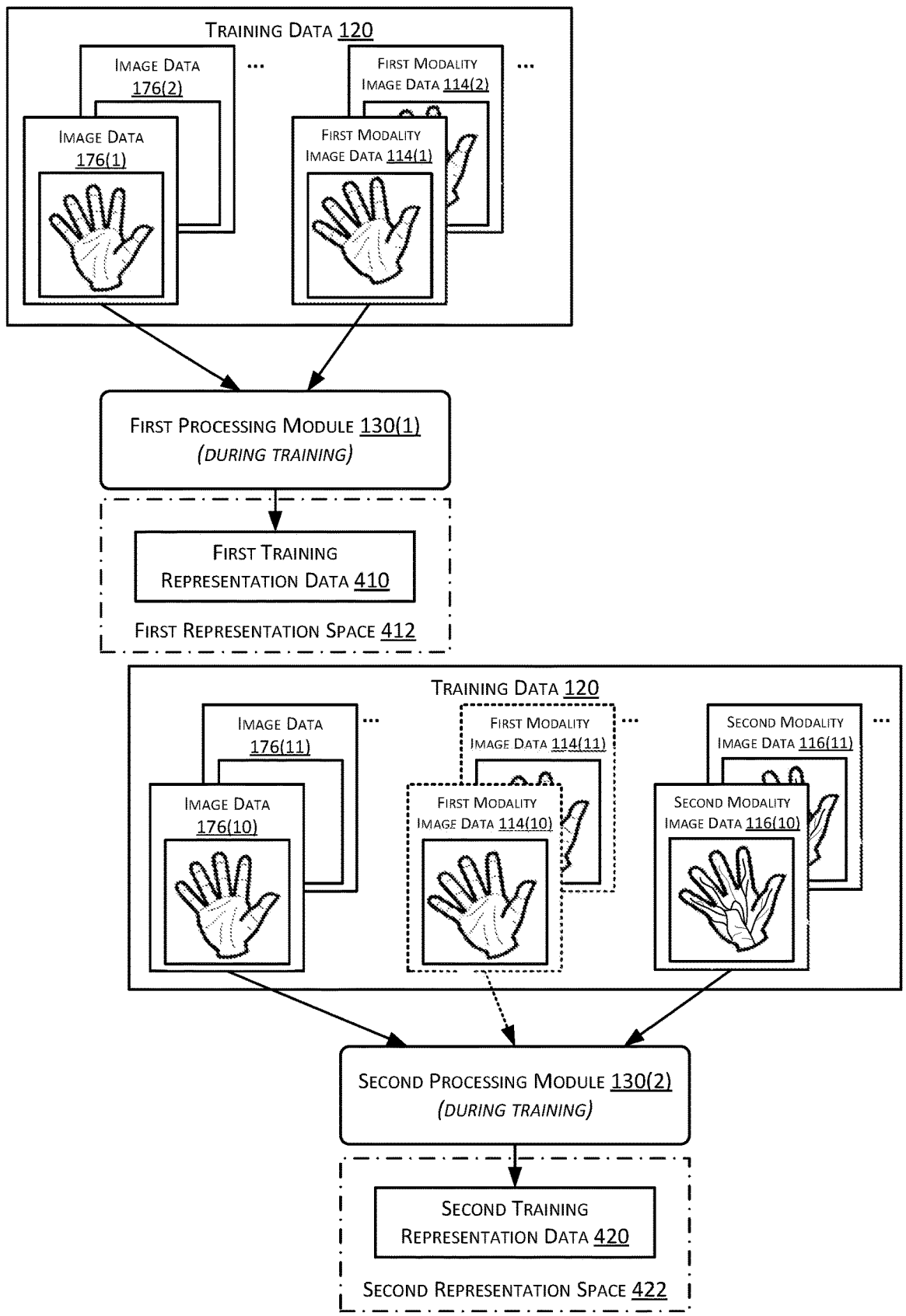
FIG. 4 illustrates training of a first processing module and a second processing module, according to some implementations.

FIG. 4 illustrates at 400 training of a first processing module 130(1) and a second processing module 130(2), according to some implementations. Each of the processing modules 130 comprises a respective machine learning network. In some implementations processing modules 130 may share at least a portion of a common machine learning network, utilizing different branches or heads of that common machine learning network. The machine learning network may comprise a convolutional neural network, deep learning network, or other architecture.

During training, the processing module 130 accepts batches of training data 120 and generates first training representation data 410. A loss function is then used to assess the first training representation data 410 or other output and determine a loss value. The loss value may then be provided as feedback to modify one or more instances of model data of the processing module 130. For example, the processing module 130 may comprise a neural network with nodes having various weight values, bias values, and so forth that affect data processing through that node. Based on the loss value, one or more of these weight values, bias values, and so forth may be changed. After many iterations of the training process, the processing module 130 may produce output that is suitable for use. For example, the output may be trained to provide representation data, such as an embedding vector, that is representative of biometric features in the input and is suitable for distinguishing one identity from another.

With regard to training the first processing module 130(1), the training data 120 comprises pairs of image data 176 and first modality image data 114 that are associated with the same training identity 302. As mentioned above, the training data 120 may be incomplete or imbalanced. For example, in this illustration no image data 176(2) is available, while first modality image data 114(2) is available.

With regard to training the second processing module 130(2), the training data 120 comprises image data 176 and second modality image data 116 that are associated with the same training identity 302. As mentioned above, the training data 120 may be incomplete or imbalanced. For example, in this illustration no image data 176(11) is available, while first modality image data 114(11) and second modality image data 1116(121) is available. In some implementations the training data 120 used to train the second processing module 130(2) may also include first modality image data 114 associated with the same training identity 302.

Output from the first processing module 130(1) is associated with a first representation space 412. For example, the first training representation data 410 may comprise embedding vectors that are within a first embedding space.

Output from the second processing module 130(2) is associated with a second representation space 422. For example, the second training representation data 420 may comprise embedding vectors that are within a second embedding space.

In some situations there may be an imbalance in the instances of image data suitable for training for the various modalities, such as the RGB images. For example, there may initially be few instances of image data 176 and many instances of first modality image data 114 and second modality image data 116. If not handled appropriately, imbalances in the training data 120 may result in overfitting or underfitting issues. Techniques that may be used to mitigate data imbalance include oversampling the minority, downsampling the majority, training loss balancing, model weight balancing, and so forth.

In one implementation, oversampling to address minority identities in training may be used. For example, if an identity has fewer than 75 images, replication may be performed to increase the number to at least 75. No downsampling is performed to reduce the number of samples in majority. In a variation of this implementation, dropping or otherwise excluding from the training data 120 the top k majority identities improves performance. For example, the top 100 identities may be removed from the training data 120 in this implementation.

In a second implementation, Label-based Weighted Sampling (LWS) may be used to select the training data 120 to be used. This approach randomly samples an image i from class k at a probability p(i)=1/C(k) where C(k) is the total number of images in class k. This increases the chance of selecting the minority classes for training while downsampling the majority classes, thus ensuring label balance.

In a third implementation, substantially improved results are obtained using modality-based weighted sampling (MWS). MWS randomly samples an image i of modality m from class k at a probability p(i)=1/C(m,k)*1/|M| where C(m, k) the number of images in modality m from class k and |M| is the modality cardinality. |M| is 2 for paired identities (both first modality images and RGBs for the identity) and 1 for unpaired identities (either RGB images or first modality images available for the identity, but not both). This ensures class balance while maintaining modality balance in the data. Without this, testing shows worse performance of the processing module 130. The use of MWS to determine the training data 120 used to train the processing modules 130, in particular the first processing module 130(1) and the second processing module 130(2), produces a substantial improvement in robust separability compared to other techniques such as oversampling or LWS.

While image data 176 associated with an RGB modality is described, it is understood that the techniques described may be used to process other modalities.

Figure 5:
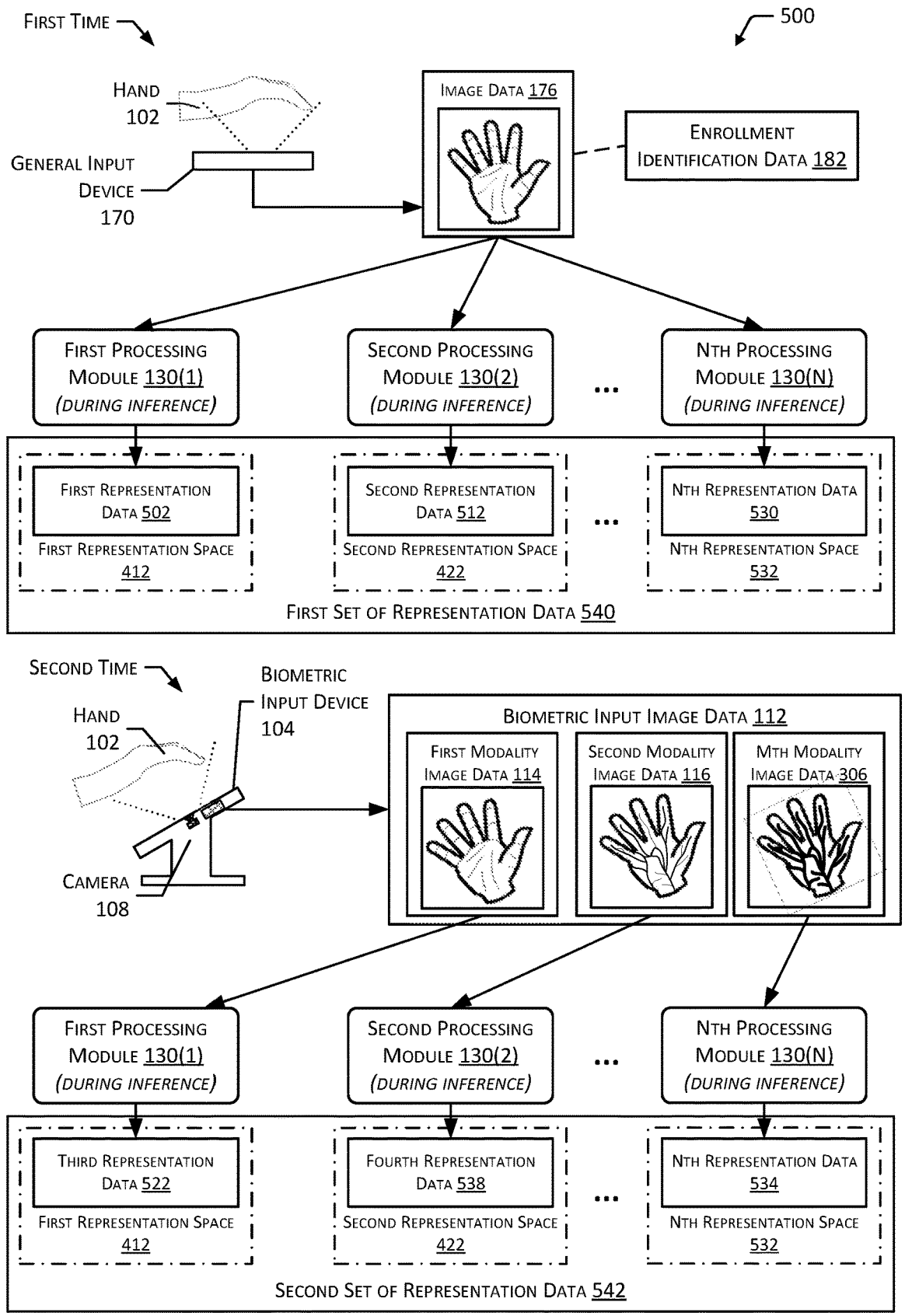
FIG. 5 illustrates use of the first processing module and the second processing module during the multi-device enrollment process, according to some implementations.

FIG. 5 illustrates at 500, use of the first processing module 130(1) and the second processing module 130(2) during the multi-device enrollment process, according to some implementations.

At a first time, the general input device 170 is used to acquire image data 176 of a user's hand 102. The general input device 170 may also be used to acquire enrollment identification data 182. The image data 176 is then processed by both of the previously trained first processing module 130(1) and the second processing module 130(2) to determine a first set of representation data 540. The first processing module 130(1) accepts as input the image data 176 and provides as output first representation data 502 that is associated with the first representation space 412. The second processing module 130(2) accepts as input the image data 176 and provides as output second representation data 512 that is associated with the second representation space 422. The first set of representation data 540 comprises the first representation data 502 and the second representation data 512.

In other implementations additional modalities may be processed as well. For example, an Nth processing module 130(N) may accept the RGB data 176 as input to determine nth representation data 530 in an Nth representation space 532.

At a second time, the biometric input device 104 is used to acquire biometric input image data 112 comprising first modality image data 114 and the second modality image data 116. The first modality image data 114 and the second modality image data 116 are processed to determine a second set of representation data 542.

The first modality image data 114 is then processed by the previously trained first processing module 130(1) to determine third representation data 522 that is associated with the first representation space 412.

The second modality image data 116 is then processed by the previously trained second processing module 130(2) to determine fourth representation data 532 that is associated with the second representation space 422.

In other implementations additional modalities may be processed as well. For example, the Nth processing module 130(N) may accept Mth modality image data 306 as input to determine Nth representation data 534 in the Nth representation space 532.

While image data 176 associated with an RGB modality is described, it is understood that the techniques described may be used to process other modalities.

Figure 6:
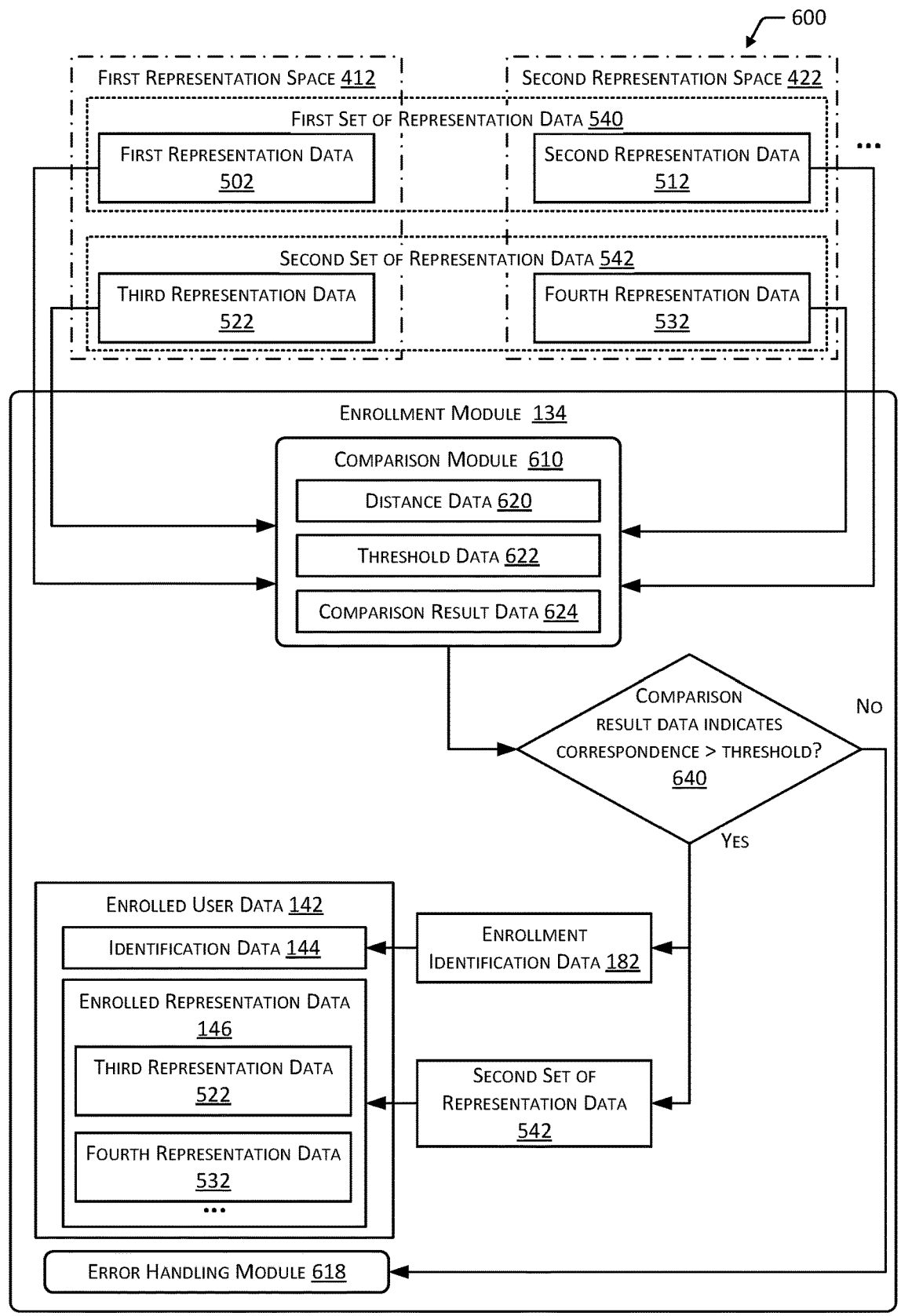
FIG. 6 is a block diagram of a comparison module that may be used during multi-device enrollment, according to some implementations.

FIG. 6 is a block diagram 600 of a comparison module that may be used during multi-device enrollment, according to some implementations. As described with regard to FIG. 5, during the first time the first set of representation data 540 comprising the first representation data 502 and the second representation data 512 are acquired from a user. As also described with regard to FIG. 5, during the second time the second set of representation data 542 comprising the third representation data 522 and the fourth representation data 538 are acquired from a user.

The enrollment module 134 may utilize a comparison module 610 to determine a correspondence between the first set of representation data 540 and the second set of representation data 542.

In one implementation, the comparison module 610 may determine distance data 620 indicative of a distance in a respective representation space. For example, first distance data 620(1) may be calculated as a cosine distance between the first representation data 502 and the third representation data 522. Continuing the example, second distance data 620(2) may be calculated as a cosine distance between the second representation data 512 and the fourth representation data 538.

The distance data 620 may be compared to a threshold value specified by threshold data 622 to determine comparison result data 624. For example, if the first distance data 620(1) indicates a distance that is less than a first threshold value, and the second distance data 620(2) indicates a distance that is less than a second threshold value, then the general input image data 172 and the biometric input image data 112 may be deemed to correspond to a same hand 102. If not, the general input image data 172 and the biometric input image data 112 may be deemed to not correspond or correspond to different hands 102.

In some implementations, the comparison module 610 may include a classifier or other machine learning system that may be trained to accept the first set of representation data 540 and the second set of representation data 542 as input and provide as output comparison result data 624 indicative of a classification of "{inputs_correspond}" or "{no_correspondence}". In some implementations the threshold data 622 may specify one or more thresholds associated with operation of the classifier.

At 640 the comparison result data 624 is assessed. If at 640 the comparison result data 624 indicates the first set of representation data 540 and the second set of representation data 542 correspond to one another greater than a threshold value, the process may proceed to complete enrollment by storing the second set of representation data 542 (or other information based on the biometric input image data 112) as the enrolled representation data 146, and storing the enrollment identification data 182 that is associated with the general input image data 172 as the identification data 144 associated with the enrolled representation data 146.

If at 640 the general input image data 172 and the biometric input image data 112 are deemed to not correspond to one another, an error handling module 618 may be used. For example, the error handling module 618 may generate a prompt to the user to provide additional information, or perform an alternative enrollment process.

In some implementations, instead of or in addition to the representation data, one or more of the pending enrollment data 136 or the enrolled user data 142 may comprise image data that has been acquired during use of the system 100. For example, general input image data 172, biometric input image data 112, and so forth may be stored as a gallery of images that are associated with the respective enrollment identification data 182 or identification data 144.

In some implementations, the enrolled representation data 146 may include representation data 132 that is determined using other processing modules 130. For example, a third processing module 130(3) may be trained to accept as input the first modality image data 114 and the second modality image data 116 and determine representation data 132 that may be stored as the enrolled representation data 146.

In other implementations utilizing additional processing modules 130, such as the Nth processing module(s) 130(N) (not shown), the comparison module 610 may compare the outputs of those Nth processing module(s) 130(N) in similar fashion, such as the Nth representation data 530 being compared to the Nth representation data 534.

Figure 7A:
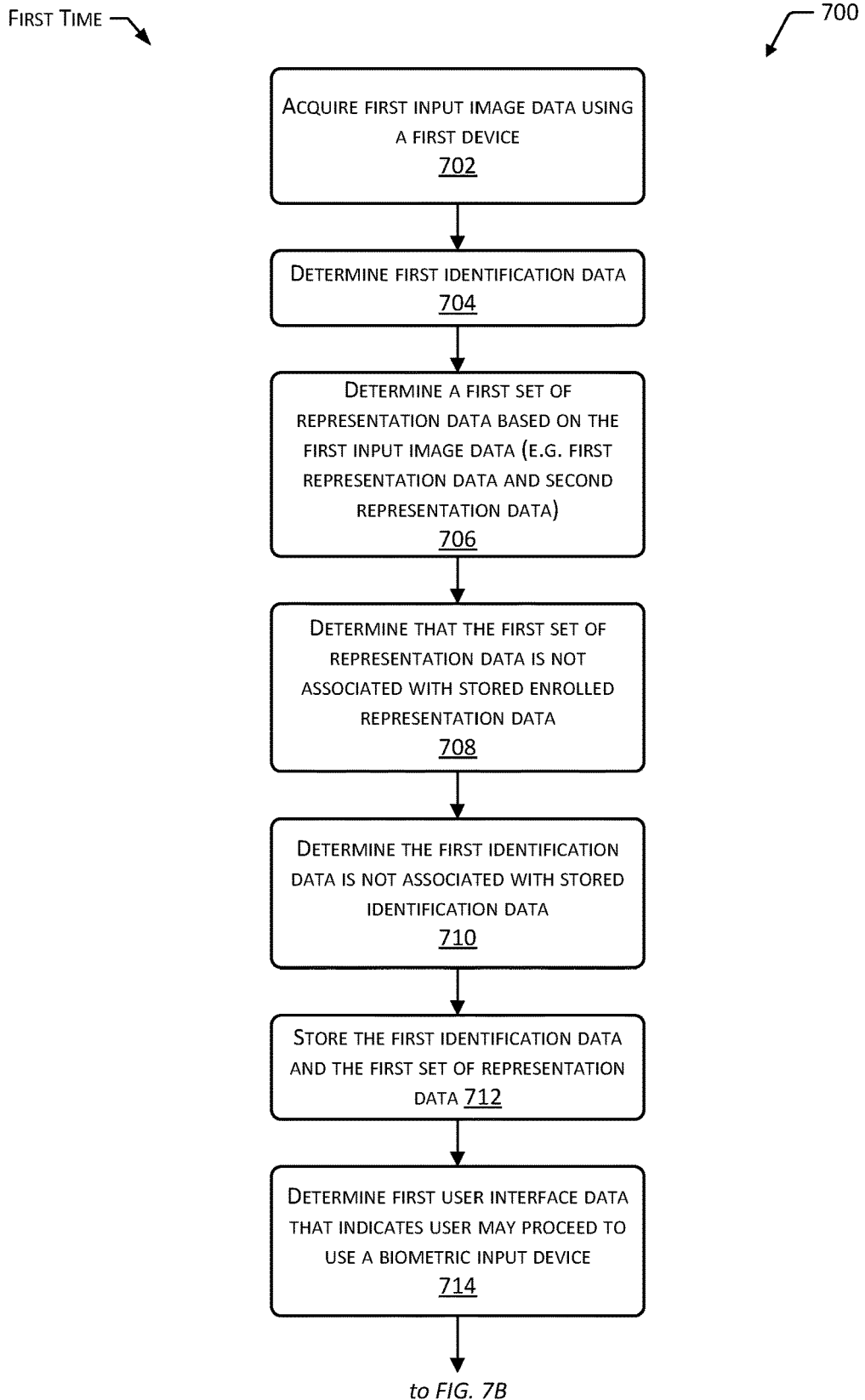
FIGS. 7A-7B depict a flow diagram of a process to perform a multi-device enrollment process, according to some implementations.
Figure 7B:
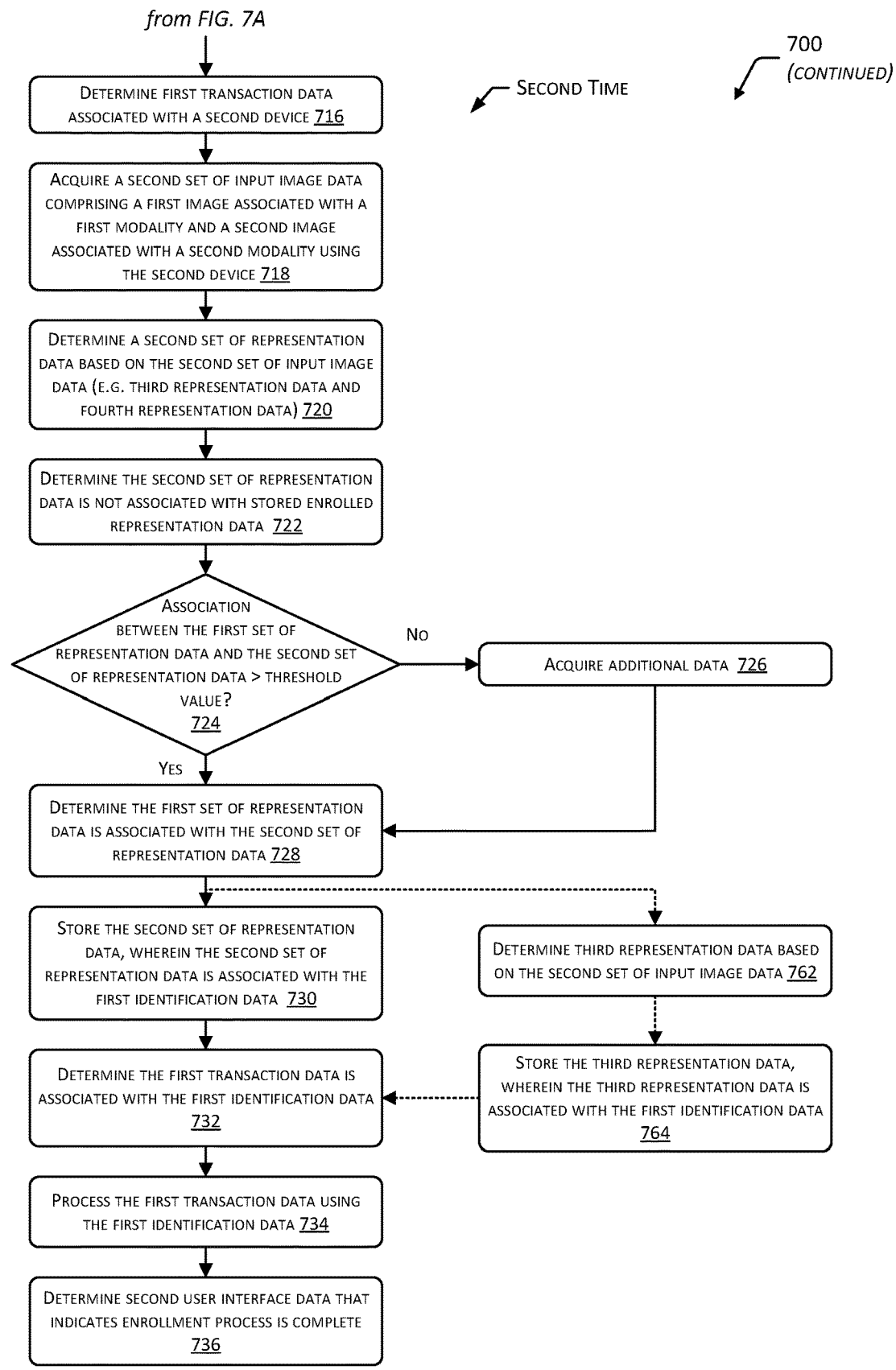

FIGS. 7A-7B depict a flow diagram 700 of a process to perform a multi-device enrollment process, according to some implementations. The process may be implemented by one or more computing devices of the system 100, such as a computing device of the general input device 170, the computing device 106 of the biometric input device 104, the computing devices 118, or other devices. The user opts in to use the system 100. The following process may then be initiated following the opt-in by the user.

The operations shown in FIG. 7A with respect to 702 through 714 may be associated with a first time.

At 702 first input image data is acquired using a first device. For example, the general input device 170 may be used to acquire the general input image data 172 at a first time. The general input image data 172 may comprise image data 176. For example, the input image data 176 may comprise a RGB image acquired using a RGB camera. In another example, a device may be used to acquire the first input image data using another modality.

In some implementations, a first device is determined to be approved for use in the multi-device enrollment process. For example, the first device may be a general input device 170 having a specified make, model, manufacturer, operating system, specified application, application version, geolocation, and so forth. In one implementation, the first device may send information such as first supplemental data 174(1) to the computing device 118 as part of a request to initiate the multi-device enrollment process. The computing device 118 may determine that the first supplemental data 174(1) indicates an approved make and model of general input device 170 that is located within an approved geolocation or geofenced area, such as a specified state or country. In some implementations, a general input device 170 that is approved for use may comprise a camera capable of a minimum resolution, a flash capable of specified illumination, a secure compute environment (SCE), and so forth.

At 704 first identification data is determined. For example, enrollment identification data 182 may be received from the general input device 170, retrieved from storage, and so forth.

At 706 a first set of representation data 540 is determined based on the first input image data. For example, the general input image data 172 may be processed by both the first processing module 130(1) to determine the first representation data 502 and the second processing module 130(2) to determine the second representation data 512. In some implementations the first set of representation data 540, or data based thereon, may be stored as the enrollment representation data 184.

At 708 the first set of representation data 540 is determined to not be associated with stored enrolled user data 142. For example, if the first set of representation data 540 corresponds to previously stored enrolled representation data 146, the identification module 150 may accept as input the first set of representation data 540 and return data indicative of no corresponding enrolled representation data 146.

In some implementations, at 710 the first identification data is deemed to not be associated with stored identification data 144 in the enrolled user data 142. For example, the first identification data may comprise user data 204 such as a legal name, telephone number, account identifier, and so forth. The identification data 144 may be searched to determine if the first identification data is already present within the enrolled user data 142. If yes, the user may be presented with a prompt in a user interface that indicates they are already enrolled. If no, the process may proceed to 712.

At 712 the first identification data and the first set of representation data 540 are stored. For example, the enrollment identification data 182 and the enrollment representation data 184 are stored for use at the second time.

In some implementations, at 714 first user interface data may be determined that indicates the user may proceed to use the system 100. The first user interface data may then be used to cause an output to the user. For example, the first user interface data may comprise text that may be presented to the user via an output device such as a display device.

The operations shown in FIG. 7B with respect to 716 through 764 may be associated with a second time.

In some implementations, at 716 first transaction data associated with a second device is determined. The transaction data may be indicative of a purchase, request for physical access, authorization to perform a function, and so forth. For example, the transaction data may comprise a request to charge a payment account for a retail purchase. As described above, with the multi-device enrollment process begun at the first time, an initial use of a biometric input device 104 may involve processing of transaction data. As a result, the initial use may result in completion of data acquisition for enrollment while also completing a transaction.

At 718 a second set of input image data is acquired using the second device. For example, the biometric input device 104 may be used to acquire the biometric input image data 112 at the second time. The biometric input image data 112 comprises first modality image data 114 and the second modality image data 116.

At 720 a second set of representation data 542 is determined based on the second set of input image data. For example, the first modality image data 114 may be processed by the first processing module 130(1) to determine third representation data 522 and the second modality image data 116 may be processed by the second processing module 130(2) to determine fourth representation data 538.

At 722, in one implementation the second set of representation data 542 is determined to not be associated with stored enrolled user data 142. For example, the identification module 150 may accept as input the second set of representation data 542 and return data indicative of no corresponding enrolled representation data 146.

In another implementation, instead of or in addition to 722, the process may determine third representation data based on the second set of input image data (such as described with regard to 762). The third representation data may then be compared to enrolled representation data 146 to determine if the user has been previously enrolled. If yes, the process may end. If no, the process may proceed to 724.

At 724 a determination may be made as to whether an association between the first set of representation data 540 and the second set of representation data 542 is greater than a threshold value. For example, the correspondence between the first representation data 502 and the third representation data 522, and between the second representation data 512 and the fourth representation data 538 may be expressed as a confidence value that is compared to the threshold value. If the association is less than or equal to the threshold value, the process proceeds to 726. The determination may be performed by the comparison module 610, based on the comparison result data 624. In some implementations, if the association is less than a minimum threshold value, the process may end.

At 726 additional data may be acquired. For example, the additional data may comprise user data 204. In some implementations the second device may be used to acquire the additional data. For example, the biometric input device 104(1) may prompt the user to present an EMV card for reading by a reader of the biometric input device 104(1), may prompt the user to enter an authentication code, may prompt the user to enter a telephone number, and so forth. In other implementations, the additional data may be acquired using another device, such as providing information on a device such as a cellular telephone that is associated with the enrollment identification data 182. In some implementations, the additional data may comprise audio data such as of the user speaking, image data such as of the user's face, and so forth. The additional data may be assessed and if deemed to correspond to the information associated with the enrollment identification data 182, the process proceeds to 728. If not, an error message may be presented and the process may end.

If at 724 the association between the first set of representation data 540 and the second set of representation data 542 is greater than the threshold value, then the process proceeds to 728.

At 728 the first set of representation data 540 is determined to be associated with the second set of representation data 542.

At 730 the second set of representation data 542 and the first identification data are stored. For example, the second set of representation data 542 may be stored as the enrolled representation data 146, and at least a portion of the enrollment identification data 182 or data based thereon may be stored as the identification data 144. Also stored is an association between the particular enrolled representation data 146 and the particular identification data 144.

In one implementation an alternative representation may be subsequently used by the system 100 instead of, or in addition to, the second set of representation data 542. In this implementation, at 762 third representation data is determined based on the second set of input image data. For example, the second set of image data comprising the first modality image data 114 and the second modality image data 116 may be processed by a third processing module 130(3) to determine the third representation data.

At 764, the third representation data may be stored as the enrolled representation data 146. Also stored is an association between the particular enrolled representation data 146 and the particular identification data 144.

At this point, the enrollment process may be deemed to be complete, and the associated pending enrollment data 136 associated with the newly enrolled identity may be deleted or otherwise discarded.

During subsequent use of the system 100, additional biometric input image data 112 or representation data 132 based thereon may be subsequently added to the enrolled representation data 146.

With the enrollment process complete, the first transaction data associated with the user may also be processed.

At 732 the first transaction data is associated with the first identification data. For example, the first transaction data may be deemed to be associated with the identification data 144 in the enrolled user data 142.

At 734 the first transaction data is processed using the first identification data. Continuing the example, a user identification or payment account information associated with the first identification data may be determined and used to process the first transaction data to bill the payment account specified by the payment account information.

In some implementations, at 736 second user interface data may be determined that indicates the completion of the enrollment process. The second user interface data may then be used to cause an output to the user. For example, the second user interface data may comprise text that may be presented to the user via an output device such as a display device.

In some implementations the process may be used to migrate previously enrolled users to other processing modules 130 or input devices, such as different biometric input devices 104 or general input devices 170. For example, one or more of the biometric input devices 104 or the processing modules 130 may be changed over time. These changes may result in changes to the representation data 132 produced. The process may be used to update the enrolled representation data 146. For example, at 702 previously stored biometric input image data 112 may be retrieved and at 704 the first identification data may comprise the identification data 144. The process, or a portion thereof, may then proceed as described.

Figure 8:
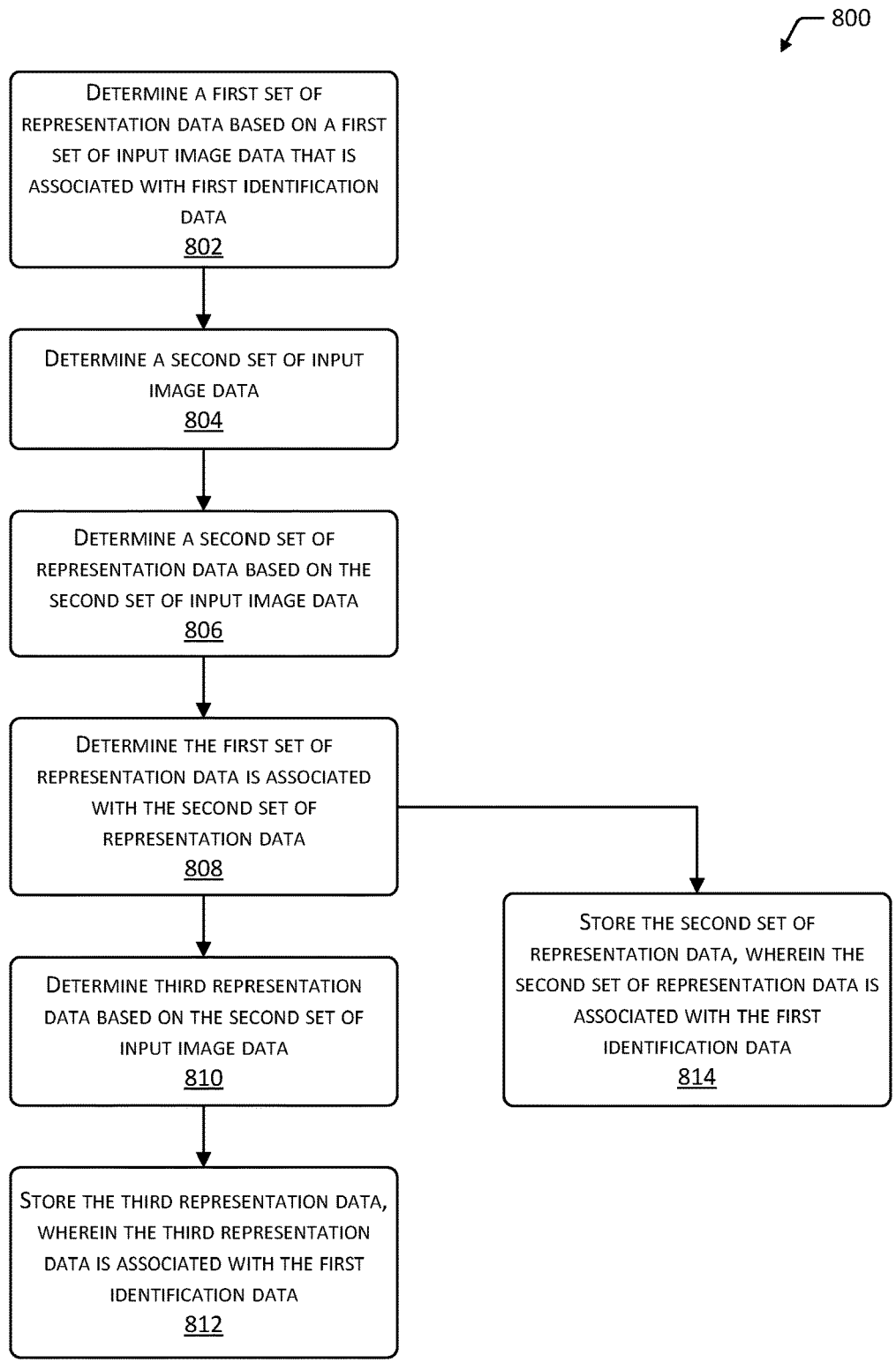
FIG. 8 depicts a flow diagram of a process to migrate data, according to some implementations.

FIG. 8 depicts at a flow diagram 800 of a process to migrate data, according to some implementations. The process may be implemented by one or more computing devices of the system 100, such as a computing device of the general input device 170, the computing device 106 of the biometric input device 104, the computing devices 118, or other devices.

In some situations, one or more of the general input devices 170, biometric input devices 104, processing modules 130, or other elements of the system 100 may be changed. For example, a biometric input device 104(17) may be developed that implements a new modality, uses different image processing algorithms, and so forth. In another example, a processing module 130(37) may be replaced with another processing module 130(38) that has different operational characteristics. The techniques and systems described herein with regard to multi-device enrollment may also be used to provide for a seamless migration of previously enrolled users, allowing such changes to be made without requiring the user to perform another enrollment process.

At 802 a first set of representation data 540 is determined based on a first set of input image data that is associated with first identification data. For example, the first set of input image data that is associated with the identification data 144 for a particular identity may be retrieved from enrolled user data 142. In another example, the first set of representation data 540 may have been stored as enrolled user data 142 that is associated with the identification data 144 for the particular identity. In yet another example, a first set of input image data may be acquired and subsequently processed as described above to determine the first set of representation data 540.

At 804 a second set of input image data is acquired. For example, the second set of input image data may be retrieved from storage. In another example, a second set of input image data may be acquired using a device. This may be the same or a different device used to acquire the first set of input image data.

At 806 a second set of representation data 542 is determined based on the second set of input image data. For example, input images associated with one or more modalities may be processed by their respective processing modules 130 to determine representation data.

At 808 the first set of representation data 540 is associated with the second set of representation data 542. For example, the comparison module 610 may be used to determine that the association exceeds a threshold value. In another example, data indicative of an association with the identification data 144 indicative of the same identity may be used.

At 810 third representation data is determined based on the second set of input image data. For example, one or more images within the second set of image data may be processed by their respective processing modules 130 to determine representation data.

At 812 the third representation data may be stored as the enrolled representation data 146. Also stored is an association between the particular enrolled representation data 146 and the particular identification data 144.

In some implementations, at 814 the second set of representation data 542 and the first identification data are stored. For example, the second set of representation data 542 may be stored as the enrolled representation data 146, and at least a portion of the enrollment identification data 182 or data based thereon may be stored as the identification data 144. Also stored is an association between the particular enrolled representation data 146 and the particular identification data 144.

At this point, the migration process may be deemed to be complete. During subsequent use of the system 100, additional biometric input image data 112 or representation data 132 based thereon may be subsequently added to the enrolled representation data 146.

Figure 9:
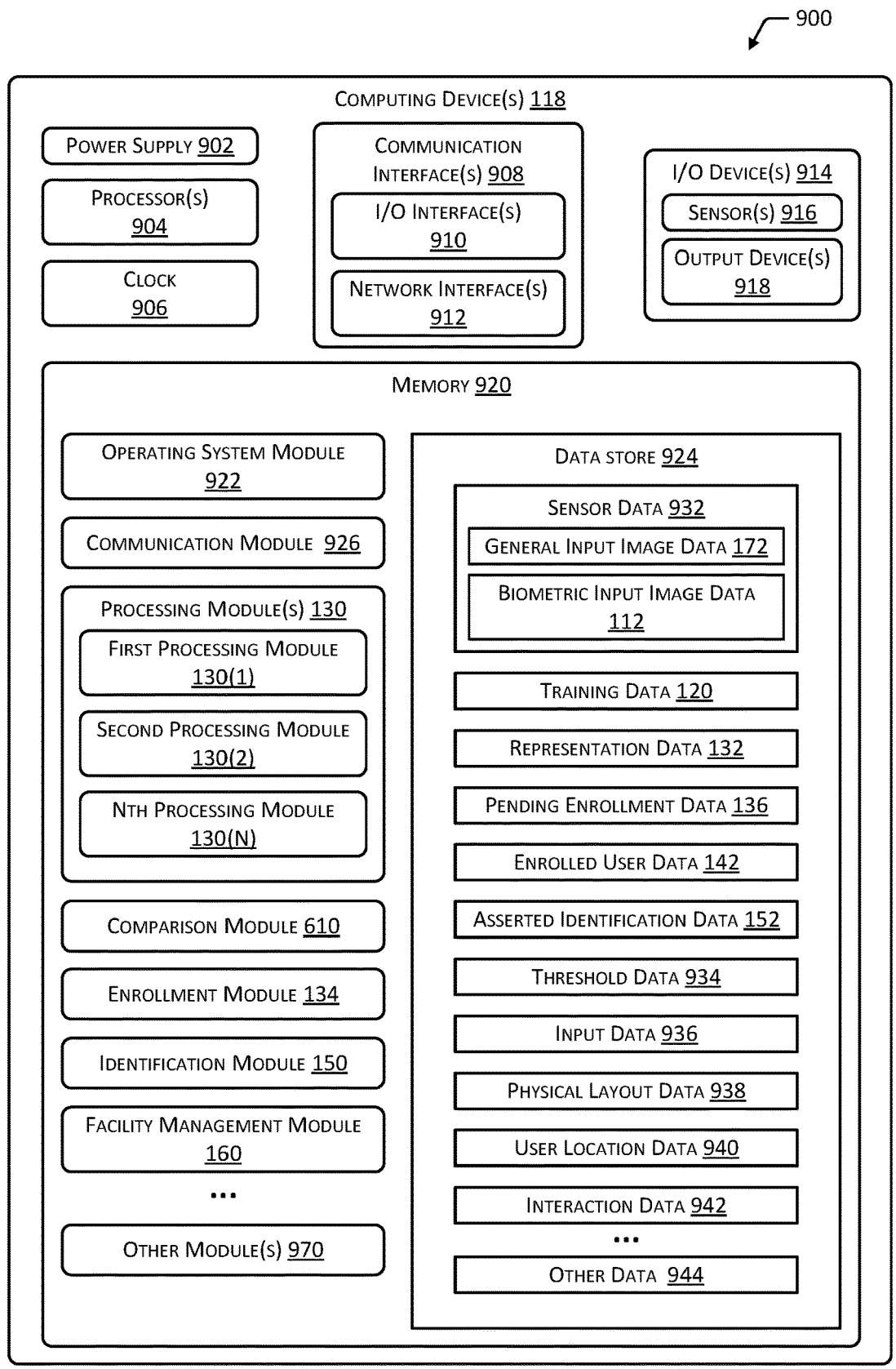
FIG. 9 is a block diagram of a computing device to implement the system, according to some implementations.

FIG. 9 is a block diagram 900 of a computing device 118 to implement the system 100, according to some implementations. The computing device 118 may be within the biometric input device 104, may comprise a server, and so forth. The computing device 118 may be physically present at the facility, may be accessible by a network, or a combination of both. The computing device 118 does not require end-user knowledge of the physical location and configuration of the system that delivers the services. Common expressions associated with the computing device 118 may include "embedded system", "on-demand computing", "software as a service (SaaS)", "platform computing", "network-accessible platform", "cloud services", "data centers", and so forth. Services provided by the computing device 118 may be distributed across one or more physical or virtual devices.

One or more power supplies 902 may be configured to provide electrical power suitable for operating the components in the computing device 118. The one or more power supplies 902 may comprise batteries, capacitors, fuel cells, photovoltaic cells, wireless power receivers, conductive couplings suitable for attachment to a power source such as provided by an electric utility, and so forth. The computing device 118 may include one or more hardware processors 904 (processors) configured to execute one or more stored instructions. The processors 904 may comprise one or more cores. One or more clocks 906 may provide information indicative of date, time, ticks, and so forth. For example, the processor 904 may use data from the clock 906 to associate a particular interaction with a particular point in time.

The computing device 118 may include one or more communication interfaces 908 such as input/output (I/O) interfaces 910, network interfaces 912, and so forth. The communication interfaces 908 enable the computing device 118, or components thereof, to communicate with other devices or components. The communication interfaces 908 may include one or more I/O interfaces 910. The I/O interfaces 910 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 910 may couple to one or more I/O devices 914. The I/O devices 914 may include input devices such as one or more of a sensor 916, keyboard, mouse, scanner, and so forth. The I/O devices 914 may also include output devices 918 such as one or more of a display device, printer, audio speakers, and so forth. In some embodiments, the I/O devices 914 may be physically incorporated with the computing device 118 or may be externally placed. The sensors 916 may comprise the camera 108, smartcard readers, touch sensors, microphones, and so forth.

The network interfaces 912 may be configured to provide communications between the computing device 118 and other devices, such as routers, access points, and so forth. The network interfaces 912 may include devices configured to couple to personal area networks (PANs), local area networks (LANs), wireless local area networks (WLANS), wide area networks (WANs), and so forth. For example, the network interfaces 912 may include devices compatible with Ethernet, Wi-Fi, Bluetooth, and so forth.

The computing device 118 may also include one or more buses or other internal communications hardware or software that allow for the transfer of data between the various modules and components of the computing device 118.

As shown in FIG. 9, the computing device 118 includes one or more memories 920. The memory 920 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 920 provides storage of computer-readable instructions, data structures, program modules, and other data for the operation of the computing device 118. Several functional modules are shown stored in the memory 920, although the same functionality may alternatively be implemented in hardware, firmware, or as a system on a chip (SoC).

The memory 920 may include at least one operating system (OS) module 922. The OS module 922 is configured to manage hardware resource devices such as the I/O interfaces 910, the I/O devices 914, the communication interfaces 908, and provide various services to applications or modules executing on the processors 904. The OS module 922 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; and so forth.

A communication module 926 may be configured to establish communications with the computing device 118, servers, other computing devices 106, or other devices. The communications may be authenticated, encrypted, and so forth.

The processing modules 130(1)-(N) may be stored in the memory 920.

The enrollment module 134 may be stored in the memory 920.

The comparison module 610 may be stored in the memory 920.

The identification module 150 may be stored in the memory 920.

Also stored in the memory 920 may be a data store 924. These modules may be executed as foreground applications, background tasks, daemons, and so forth. The data store 924 may use a flat file, database, linked list, tree, executable code, script, or other data structure to store information. In some implementations, the data store 924 or a portion of the data store 924 may be distributed across one or more other devices including other computing devices 106, network attached storage devices, and so forth.

The data store 924 may store the sensor data 932, the training data 120, representation data 132, pending enrollment data 136, enrolled user data 142, asserted identification data 152, and other data.

The data store 924 may store threshold data 934 comprising one or more threshold values used during operation of the system 100. For example, the threshold data 934 may comprise the threshold data 622.

The data store 924 may store input data 936. For example, the input data 936 may comprise data obtained from external to the system 100, such as from a user or another system.

The data store 924 may store trained model data such as determined during training of the one or more processing modules 130. The trained model data may comprise weight values, bias values, and other data determined during training of the machine learning network that is representative of the training of the network.

In some implementations, one or more of the general input image data 172 or the biometric input image data 112 may be stored during processing by the processing module(s) 130 or other modules. For example, the biometric input device 104 may acquire the biometric input image data 112, determine representation data 132 based on the biometric input image data 112, and then erase the biometric input image data 112. The resulting representation data 132 may then be sent to a server or other computing device 118 to perform enrollment, for comparison to assert an identity, and so forth.

The facility management module 160 may be stored in the memory 920. The facility management module 160 may perform various functions, such as tracking items between different inventory locations, to and from carts, generating restocking orders, directing operation of robots within the facility, using the asserted identification data 152 to associate a particular user identity with a user in the facility, and so forth. During operation, the facility management module 160 may access sensor data 932 such as biometric input image data 112, or data from other sensors 916.

Information used by the facility management module 160 may be stored in the data store 924. For example, the data store 924 may be used to store physical layout data 938, sensor data 932, asserted identification data 152, user location data 940, interaction data 942, and so forth. For example, the sensor data 932 may comprise the biometric input image data 112 obtained from a biometric input device 104 associated with the facility.

The physical layout data 938 may provide information indicative of where biometric input devices 104, cameras, weight sensors, antennas for radio receivers, inventory locations, and so forth are within the facility with respect to one another. For example, the physical layout data 938 may comprise information representative of a map or floor plan of the facility with relative positions of gates with biometric input devices 104 and inventory locations.

The facility management module 160 may generate the user location data 940 that is indicative of the location of the user within the facility. For example, the facility management module 160 may use image data obtained by the cameras to determine a location of the user. In other implementations, other techniques may be used for determining the user location data 940. For example, data from a smart floor may be used to determine the location of the user.

The identification data 144 may be associated with user location data 940. For example, the user enters the facility and has their hand 102 scanned by the biometric input device 104, resulting in asserted identification data 152 that is associated with their time of entry and the biometric input device 104 location. The user location data 940 indicative of a path of the user that begins at the biometric input device 104 location at the time of entry may be associated with the user identifier in the asserted identification data 152.

Based on the user location data 940 and the interaction data 942, a particular interaction may be associated with an account of a particular user. For example, if the user location data 940 indicates that the user is present in front of inventory location 1397 at time 09:02:02 and the interaction data 942 indicates a pick of a quantity of one item from an area on inventory location 1397 at 09:04:13, the user may be billed for that pick.

The facility management module 160 may use the sensor data 932 to generate the interaction data 942. The interaction data 942 may include information about the type of item involved, quantity involved, whether the interaction was a pick or place, and so forth. Interactions may include the user picking an item from an inventory location, placing an item at the inventory location, touching an item at the inventory location, rummaging through items at the inventory location, and so forth. For example, the facility management module 160 may generate interaction data 942 that indicates what item the user picked from a particular lane on a shelf, and then use this interaction data 942 to adjust the count of inventory stowed at that lane. The interaction data 942 may then be used to bill an account associated with the user identifier that is associated with the user who picked the item.

The facility management module 160 may process the sensor data 932 and generate output data. For example, based on the interaction data 942, a quantity of a type of item at a particular inventory location may drop below a threshold restocking level. The system may generate output data comprising a restocking order indicative of the inventory location, the area, and a quantity needed to replenish stock to a predetermined level. The restocking order may then be used to direct a robot to restock that inventory location.

Other modules 970 may also be present in the memory 920 as well as other data 944 in the data store 924. For example, a billing module may use the interaction data 942 and the asserted identification data 152 to bill an account associated with a particular user.

The devices and techniques described in this disclosure may be used in a variety of other settings. For example, the system 100 may be used in conjunction with a point-of-sale (POS) device. The user may present their hand 102 to a biometric input device 104 to provide an indication of intent and authorization to pay with an account associated with the asserted identification data 152. In another example, a robot may incorporate a biometric input device 104. The robot may use the asserted identification data 152 to determine whether to deliver a parcel to the user, and based on the asserted identification data 152, which parcel to deliver.

While the input to the system 100 is discussed with respect to image data, the system may be used with other types of input. For example, the input may comprise data acquired from one or more sensors 916, data generated by another system, and so forth. For example, instead of image data produced by the camera 108, the input to the system 100 may comprise an array of data. Other modalities may also be used. For example, the first modality may be visible light, the second modality may be sonar, and so forth.

While the system 100 is discussed with respect to processing biometric data, the system may be used with other types of data. For example, the input may comprise satellite weather imagery, seismic data, product images, data indicative of chemical composition, and so forth. For example, instead of image data produced by the camera 108, the input to the system 100 may comprise an array of data.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
one or more memories, storing first computer-executable instructions; and
one or more hardware processors to execute the first computer-executable instructions to:
acquire first input image data using a red-green-blue (RGB) camera of a first device, wherein the first input image data comprises a red-green-blue (RGB) image;
determine first identification data associated with the first input image data;
determine, using a first processing module to process the first input image data, first representation data that is associated with a first representation space;
determine, using a second processing module to process the first input image data, second representation data that is associated with a second representation space;
store the first identification data, the first representation data, and the second representation data;
acquire, using a second device, second input image data that is associated with a first modality;
acquire, using the second device, third input image data that is associated with a second modality;
determine, using the first processing module to process the second input image data, third representation data that is associated with the first representation space;

determine, using the second processing module to process the third input image data, fourth representation data that is associated with the second representation space;
determine that the first representation data is associated with the third representation data;
determine that the second representation data is associated with the fourth representation data; and
store the first identification data, the third representation data and the fourth representation data, wherein the first identification data is associated with the third representation data and the fourth representation data.

2. The system of claim 1, the one or more hardware processors to execute the first computer-executable instructions to:
train a machine learning network of the first processing module using first training data comprising:
first RGB image data acquired using an RGB camera; and
first modality image data that is associated with the first modality; and
train a machine learning network of the second processing module using second training data comprising:
second RGB image data acquired using an RGB camera; and
second modality image data that is associated with the second modality.

3. The system of claim 1, the one or more hardware processors to execute the first computer-executable instructions to:
train a machine learning network of the first processing module using first training data comprising:
first RGB image data acquired using an RGB camera; and
first modality image data that is associated with the first modality; and
train a machine learning network of the second processing module using second training data comprising:
second RGB image data acquired using an RGB camera;
first modality image data that is associated with the first modality; and
second modality image data that is associated with the second modality.

4. The system of claim 1, the one or more hardware processors to execute the first computer-executable instructions to:
determine transaction data that is associated with the second device;
determine that the first identification data is associated with the transaction data; and
process the transaction data using the first identification data.

5. The system of claim 1, the one or more hardware processors to execute the first computer-executable instructions to:
determine, before acquisition of the first input image data, that one or more of the first device or an application executing on the first device are approved for use.

6. The system of claim 1, the one or more hardware processors to execute the first computer-executable instructions to:
determine first supplemental data that is associated with the first device and the acquisition of the first input image data;
determine second supplemental data that is associated with the second device and the second input image data and the third input image data; and
determine that at least a portion of the first supplemental data corresponds to the second supplemental data.

7. The system of claim 1, the one or more hardware processors to execute the first computer-executable instructions to:
determine supplemental data that is associated with the second device and the acquisition of the second input image data and the third input image data; and
determine that at least a portion of the supplemental data corresponds to the first identification data.

8. A computer-implemented method comprising:
acquiring, using a first device, first input image data, wherein the first input image data is associated with a first modality;
determining first identification data associated with the first input image data;
determining, based on the first input image data, first representation data that is associated with a first embedding space;
determining, based on the first input image data, second representation data that is associated with a second embedding space;
storing the first identification data, the first representation data, and the second representation data;
acquiring, using a second device, second input image data, wherein the second input image data is associated with a second modality;
acquiring, using the second device, third input image data, wherein the third input image data is associated with a third modality;
determining, based on the second input image data, third representation data that is associated with the first embedding space;
determining, based on the third input image data, fourth representation data that is associated with the second embedding space;
determining that:
the first representation data is associated with the third representation data, and
the second representation data is associated with the fourth representation data; and
storing the first identification data, the third representation data, and the fourth representation data, wherein the first identification data is associated with the third representation data and the fourth representation data.

9. The method of claim 8, further comprising:
operating, at a first time, a first camera of the first device to acquire the first input image data using visible light;
operating, at a second time:
a first illuminator of the second device to illuminate an object with infrared light having a first polarization, and
a second camera of the second device to acquire the second input image data based on light having the first polarization; and
operating, at a third time:
a second illuminator of the second device to illuminate an object with infrared light having a second polarization, and
the second camera of the second device to acquire the third input image data based on light having the first polarization.

10. The method of claim 8, wherein:
the first modality is associated with surface features of a user; and
the second modality is associated with subcutaneous features of the user.

11. The method of claim 8, further comprising:
determining first supplemental data that is associated with the first input image data;
determining second supplemental data that is associated with the second input image data and the third input image data; and
determining that at least a portion of the first supplemental data corresponds to at least a portion of the second supplemental data.

12. A system comprising:
one or more memories, storing first computer-executable instructions; and
one or more hardware processors to execute the first computer-executable instructions to:
determine first input image data acquired using a first device, wherein the first input image data is associated with a first modality;
determine, based on the first input image data, first representation data that is associated with a first embedding space using a first processing module;
determine, based on the first input image data, second representation data that is associated with a second embedding space using a second processing module;
determine second input image data acquired using a second device, wherein the second input image data is associated with a second modality;
determine third input image data acquired using the second device, wherein the third input image data is associated with a third modality;
determine, based on the second input image data, third representation data that is associated with the first embedding space; and
determine, based on the third input image data, fourth representation data that is associated with the second embedding space.

13. The system of claim 12, the one or more hardware processors to execute the first computer-executable instructions to:
determine first identification data associated with the first input image data;
determine that the first representation data is associated with the third representation data;
determine that the second representation data is associated with the fourth representation data; and
store the first identification data, the third representation data and the fourth representation data, wherein the first identification data is associated with the third representation data and the fourth representation data.

14. The system of claim 12, the first device comprising:
a first camera to acquire the first input image data using visible light; and
the second device comprising:
a first infrared illuminator comprising a first polarizer having a first polarization,
a second camera comprising a second polarizer having the first polarization, wherein the second camera acquires the second input image data using infrared light, and
a second infrared illuminator comprising a second polarizer having a second polarization; and
one or more hardware processors to execute second computer-executable instructions to:
operate, at a first time, the first infrared illuminator to illuminate an object with infrared light having the first polarization;
operate, during the first time, the second camera to acquire the second input image data;
operate, at a second time, the second infrared illuminator to illuminate the object with infrared light having the second polarization; and
operate, during the second time, the second camera to acquire the third input image data.

15. The system of claim 12, the one or more hardware processors to execute the first computer-executable instructions to:
train a machine learning network of the first processing module using first training data comprising:
first RGB image data acquired using an RGB camera; and
first modality image data that is associated with the first modality; and
train a machine learning network of the second processing module using second training data comprising:
second RGB image data acquired using an RGB camera; and
second modality image data that is associated with the second modality.

16. The system of claim 12, the one or more hardware processors to execute the first computer-executable instructions to:
train a machine learning network of the first processing module using first training data comprising:
first RGB image data acquired using an RGB camera; and
first modality image data that is associated with the first modality; and
train a machine learning network of the second processing module using second training data comprising:
second RGB image data acquired using an RGB camera;
first modality image data that is associated with the first modality; and
second modality image data that is associated with the second modality.

17. The system of claim 13, the one or more hardware processors to execute the first computer-executable instructions to:
determine transaction data that is associated with the second device;
determine that the first identification data is associated with the transaction data; and
process the transaction data using the first identification data.

18. The system of claim 12, the one or more hardware processors to execute the first computer-executable instructions to:
determine, before acquisition of the first input image data, that one or more of the first device or an application executing on the first device are approved for use.

19. The system of claim 12, the one or more hardware processors to execute the first computer-executable instructions to:
determine first supplemental data that is associated with the first device and the acquisition of the first input image data;
determine second supplemental data that is associated with the second device and the second input image data and the third input image data; and determine that at least a portion of the first supplemental data corresponds to the second supplemental data.

20. The system of claim 13, the one or more hardware processors to execute the first computer-executable instructions to:
   determine supplemental data that is associated with the second device and the acquisition of the second input image data and the third input image data; and
   determine that at least a portion of the supplemental data corresponds to the first identification data.

* * * * *